United States Patent [19]

Abbink et al.

[11] 4,007,431

[45] Feb. 8, 1976

[54] CATHODE CONSTRUCTION FOR LONG LIFE LASERS

[75] Inventors: Henry C. Abbink, Westlake Village; James W. Hostetler, Thousand Oaks, both of Calif.

[73] Assignee: Litton Systems, Inc., Beverly Hills, Calif.

[22] Filed: Feb. 3, 1975

[21] Appl. No.: 546,389

[52] U.S. Cl. ................... 331/94.5 PE; 331/94.5 T; 331/94.5 D; 356/106 LR; 330/4.3; 313/217; 29/25.17;

[51] Int. Cl.² .......................................... H01S 3/22

[58] Field of Search .................... 331/94.5; 330/4.3 313/217; 29/25.17; 356/106 LR

[56] References Cited

OTHER PUBLICATIONS

O'Hanlon, J. F., *J. of Vacuum Science J Technology*, vol. 7, No. 2, 1970, pp. 330–338.

Locker; L. D. et al., *Applied Physics Letters*, vol. 12, No. 11, June 1968, pp. 396–397.

Kucherenko et al., Chemical Abstract 64991s, vol. 78, 1963.

*Primary Examiner*—Robert J. Webster
*Attorney, Agent, or Firm*—Robert M. Vargo

[57] ABSTRACT

A laser gyro is disclosed having a long life cathode located therein. The laser gyro comprises a block having a plurality of lasing tubes bored therethrough and being angularly disposed to each other to form a closed path within the block. A plurality of mirrors are positioned at the intersection of the tubes to reflect light from one tube into the next. A pair of anodes are inserted into two of the lasing tubes. A cavity is formed within the center of the block and is connected to the triangular laser path via a conduit. The cavity contains a cathode for conducting direct current to each of the anodes. These current flows energize the lasing gas to create a pair of laser beams moving in opposite directions in the closed path. The cathode is a closed end, hollow cylinder made of aluminum having a layer of oxide formed thereon by means of anodization. The anodizationn process causes a thicker oxide layer to be formed at the sharp corners, irregular machines surfaces, and other high field areas found in the cathode, thereby serving to limit the current and decrease the hot spots at those areas. As a result, the cathode has a longer life cycle than heretofore possible.

7 Claims, 3 Drawing Figures

CATHODE CONSTRUCTION FOR LONG LIFE LASERS

BACKGROUND OF THE INVENTION

1. Field of the Invention

The present invention relates generally to lasers, especially those utilized in gyro assemblies, and more particularly, to the cathode constructions found in such assemblies.

2. Description of the Prior Art

Strapped down laser gyros have been proposed as a substitute for the gimbol mounted gyros presently utilized in inertial navigational systems.

In laser gyros, particularly those proposed for navigational systems, it is preferable that the laser gyro life cycles be as long as other components in the systems.

Heretofore, laser gyros have not had a long lifespan because of the short lifetimes of the laser cathodes. Initially, the prior art lasers were made of bare metals. The shortcoming with such a cathode construction was that the cathode, being negatively charged, would attract the positive ions in the plasma and create a sputtering problem. To overcome this problem, later cathodes have been made with a thin layer of oxide covering the metal surface. The advantage of this construction is that the oxide layer is more capable of withstanding ion bombardment while still being able to provide electron conduction through the layer at reasonable discharge voltages.

The most widely used prior art cathode of this type has been made of aluminum coated with a thin layer of oxide. During the manufacturing process the layer of aluminum oxide is formed naturally by exposing the aluminum cathode to an oxygen plasma with the aluminum cathode connected as the cathode in the circuit. The thin layer of oxide is formed due to the pressure of oxygen and the heating effect of the plasma.

Cathodes utilized in gyro lasers invariably have sharp edges and machining irregularities formed on the emitting surface. These areas tend to create high electric fields. The shortcoming with the above-mentioned method is that an even layer of oxide is formed over the entire cathode structure including the high field areas. As a result, the electron conduction is greater through these areas, thereby creating hot spots and rapid cathode degradation.

SUMMARY OF THE INVENTION

The present invention provides a cathode which obviates the above-mentioned shortcomings.

In its broadest aspect, the present invention relates to a gyro laser which includes an aluminum cathode having a thin layer of oxide formed thereon by means of plasma anodization.

A primary advantage of the present invention is that the anodization forms a thicker oxide layer at the irregular surface areas. This thicker oxide layer functions to limit the current conducted and accordingly decrease the hot spots at these areas. As a result, the cathode has more uniform emission characteristics and hence a longer life-span.

Another inherent advantage of the anodization process is that positive ions, such as sodium, which are ubiquitous and difficult to control are swept to the surface by the high electric field and removed by the plasma. These positive ions can grossly affect the emission properties of the oxide layer by altering the surface work function.

The features of the present invention, which are believed to be novel, are set forth with particularity in the appended claims. The present invention, both as to its organization and manner of operation, together with the further advantages thereof, may best be understood by reference to the following description taken in connection with the accompanying drawings.

DETAILED DESCRIPTION OF THE PREFERRED EMBODIMENT

Figure 1:
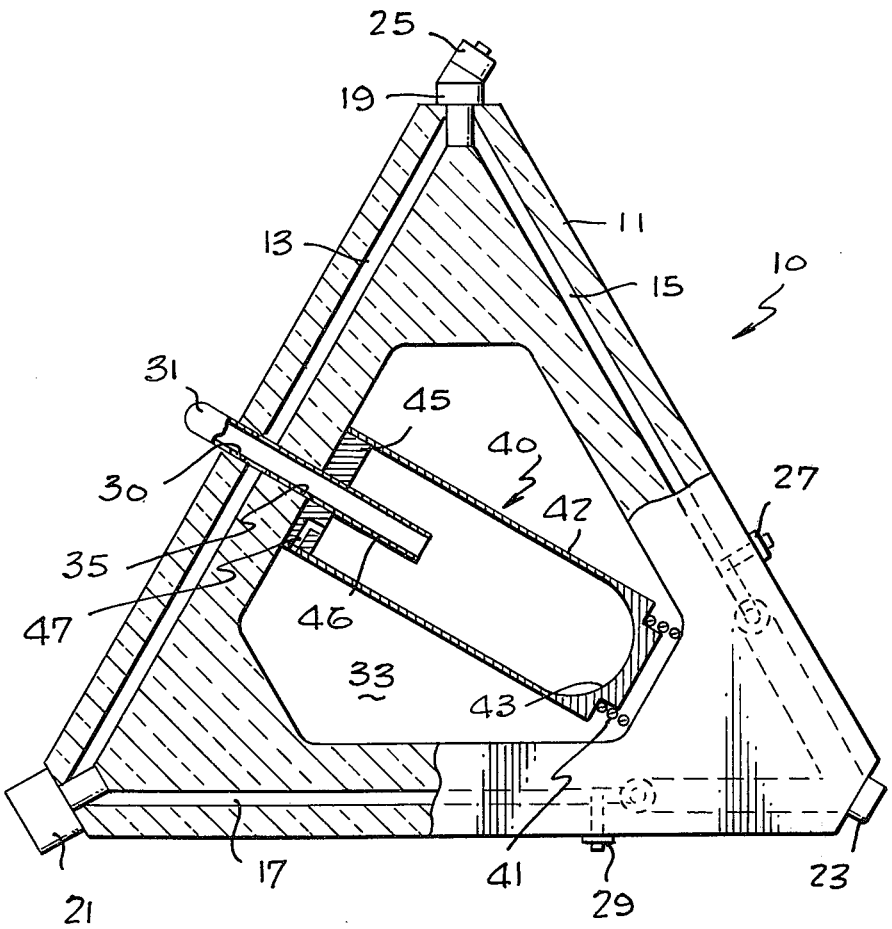
FIG. 1 is a plan view of a laser gyro with the cover removed.

Referring now to the drawings, FIG. 1 illustrates a laser gyro generally indicated by arrow 10 comprising a block 11 usually made of quartz, ceramic or the like. A group of three lasing tubes 13, 15 and 17 are bored within the block 11 at 60° angles to each other and are joined near the corners to form a triangular path. A mirror 19, 21 and 23 is located at the intersection of each of the tubes 13, 15 and 17, respectively. Each mirror functions to reflect the light from one lasing tube into the next. The mirrors 21 and 23 are 100% reflective mirrors while the mirror 19 is a 95% reflective mirror to enable a portion of the impinging light to pass through to a photo diode 25.

A pair of anodes 27 and 29 is mounted on the block 11 and is adapted to communicate with the laser tubes 15 17, respectively. A quantity of lasing gas or plasma is adapted to be contained within the lasing tubes 13, 15 and 17. The plasma is inserted into the lasing tubes through a port 30. A fill tube 31 is provided to seal off the port 30 during operation. A cavity 33 is formed within the center of the block 11 to form a reservoir for the lasing gas. The cavity is adapted to communicate with the lasing tube 13 via a cylindrical bore 35.

A cathode 40 is located within the cavity 33. The cathode 40 comprises an open-ended hollow cylinder 42, with the interior 43 of the closed end thereof forming a hemisphere. The open end of the cylinder 42 is closed by a cap member 45 which in turn engages the wall of the cavity 33. The entire cathode assembly is biased against the wall of the cavity 33 by a spring 41. The cap member 45 also includes a hollow tube portion 46 extending into the interior of the cathode 40, and an L-shaped conduit 47 formed therein which functions as an exhaust conduit. A power source (not shown) is provided to maintain a DC current between the cathode 40 and anodes 27 and 29.

In operation, a first discharge current is emitted from the interior of the hollow cathode 40, out into the tube 13 toward the mirror 19 and through the tube 15 to the anode 27. The current is controlled in intensity. A second discharge current flows from the cathode 40 out into the tube 13 toward the mirror 21 and through tube 17 to the anode 29. That current is also controlled in intensity. The discharge current functions to energize the lasing gas so that a laser beam may be maintained in the three lasing tubes 13, 15 and 17. The laser produces two identical single frequency beams of light traveling in opposite directions along a closed loop path rotating about an axis of rotation. The beam rotating in the same direction as the apparatus will be of somewhat different frequency than the beam rotating in the opposite direction. This difference in the frequency has been found to be proportionate to the rate of rotation and is measured by the photo diode 25.

Figure 2:
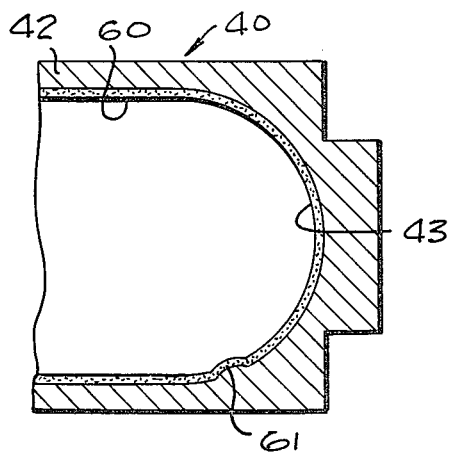
FIG. 2 is an enlarged view of the cathode showing the thin layer of oxide formed thereon.

As more clearly shown in FIG. 2, the cathode 40 is made of aluminum and includes a thin layer of oxide 60 formed thereon by plasma anodization. The plasma anodization is accomplished by using low pressure oxygen gas for the flow discharge medium with the cathode 40 being biased positively. In this manner, the cathode forms an anode in the oxygen plasma. Thus the oxide forms by an anodization process rather than a thermally activated chemical process as in previous art.

In anodization processes, the reaction rate is determined by the diffusion of oxide ions through the oxide layer being formed to the oxide-metal interface. This reaction rate is therefore a function of the electric field in the oxide and thus a function of the anodization voltage and the local oxide thickness.

It should be noted that high fields are formed at the irregularly machined surfaces corners, edges or apertures formed in the cathode interior, for example, as shown at surface 61. One of the primary advantages of the anodization procedure is that the surface 61 is in a region of higher electric field and the reaction rate is higher than elsewhere. A thicker film of oxide is formed at 61 and other similar irregular surfaces than at the other interior areas of the cathode. The advantage of this construction is that during operation of the laser, the thicker film of oxide at the high field area 61 limits the conduction of emitted electrons thereby preventing hot spots from forming. As a result, a unique cathode construction is provided having a longer life than heretofore possible.

Figure 3:
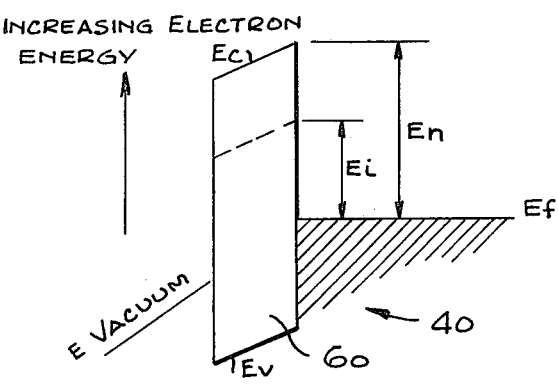
FIG. 3 is a schematic diagram illustrating the effects of impurities on the emission barrier.

Another source of non-uniform electron emission from the cathode is impurities which cause local lowering of the emission barrier. For example, sodium is a commonly encountered impurity which is very difficult to eliminate. Sodium has a very low work function and is known to lower the work function of other metals when only monoatomic layers of sodium are deposited on these higher work function metals. Therefore, extremely small quantities of sodium or other alkali ion impurity in the oxide can cause local high emission. The mechanism can be understood by reference to FIG. 3. In the cathode metal, 40, the electrons which can be emitted are primarily at the Fermi energy $E_f$. These electrons must penetrate the oxide layer 60, either by quantum mechanical tunneling, or by thermal exitation into the conduction band of the oxide at energy $E_c$. In either case the penetration probability decreases exponentially with the height of the barrier. Thus if the height of the barrier for the clean metal-metal oxide interface is $E_n$ and the height of the barrier for the interface containing impurities is reduced to $E_i$, and the impurities are distributed non-uniformly over the surface, then there will be greatly increased emission from the local areas containing impurities.

During plasma anodization the electric field direction is such that metal ion impurities in the oxide migrate under the influence of the field to the surface of the oxide where they are removed by ion bombardment. Plasma anodization thus results in a very high purity oxide layer with uniform emission properties.

It should be noted that various modifications can be made to the assembly while still remaining within the purview of the following claims.

What is claimed is:

1. A cathode for a laser comprising:
    a housing having a hollow interior made of a metal forming an electron emitting surface; and
    a layer of oxide formed on said electron emitting surface by means of plasma anodization said cathode being the anode for plasms anodization purposes, said oxide layer being thicker at the high field areas of said electron emitting surface.

2. The combination of claim 1 wherein said metal forming said electron emitting surface is aluminum.

3. The combination of claim 2 wherein said layer of oxide is aluminum oxide.

4. The combination of claim 1 wherein said oxide layer is substantially free of impurities which induce local electron emission.

5. In combination:
    a rotatable laser gyro comprising a block having a plurality of lasing tubes bored at angles to each other to form a closed path;
    a mirror positioned at each intersection of the lasing tubes to reflect light from one tube to the other;
    a pair of anodes mounted on said block and communicating with said closed path; and
    a cathode mounted on said block, said cathode comprising a housing having a hollow interior made of a metal forming an electron emitting surface, and a layer of oxide formed on said electron emitting surface by means of plasma anodization said cathode being the anode for plasms anodization purposes, said oxide layer being thicker at the high field areas of said electron emitting surface.

6. The combination of claim 5 wherein said metal forming said electron emitting surface is aluminum.

7. The combination of claim 6 wherein said layer of oxide is aluminum oxide.

\* \* \* \* \*

UNITED STATES PATENT OFFICE
CERTIFICATE OF CORRECTION

PATENT NO. : 4,007,431

DATED : 2/8/77

INVENTOR(S) : Henry C. Abbink
James W. Hostetler

It is certified that error appears in the above-identified patent and that said Letters Patent are hereby corrected as shown below:

Issue date shown on page containing Abstract should read 2/8/77 in lieu of 2/8/76.

Signed and Sealed this

Seventeenth Day of May 1977

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 4,007,431

DATED : February 8, 1977

INVENTOR(S) : Henry C. Abbink et al.

It is certified that error appears in the above-identified patent and that said Letters Patent is hereby corrected as shown below:

Column 1, line 13, change "gimbol" to -- gimbal --;
Column 4, line 22, insert a comma between "anodization" and "said";
Column 4, line 23, change "plasms" to -- plasma --;
Column 4, line 45, insert a comma between "anodization" and "said";
Column 4, line 46, change "plasms" to -- plasma --.

Signed and Sealed this

Twenty-eighth Day of June 1983

[SEAL]

Attest:

GERALD J. MOSSINGHOFF

Attesting Officer  Commissioner of Patents and Trademarks